US012807067B2

(12) United States Patent
Weber et al.

(10) Patent No.: US 12,807,067 B2
(45) Date of Patent: Nov. 24, 2026

(54) VEHICLE TRANSPARENT DISPLAY SYSTEM AND METHOD

(71) Applicant: Velvac Incorporated, New Berlin, WI (US)

(72) Inventors: Mathew Weber, Delafield, WI (US); Mark Moeller, Spokane, WA (US); Jeffrey Delbeke, Sussex, WI (US)

(73) Assignee: Velvac Incorporated, New Berlin, WI (US)

(*) Notice: Subject to any disclaimer, the term of this patent is extended or adjusted under 35 U.S.C. 154(b) by 0 days.

(21) Appl. No.: 19/282,530

(22) Filed: Jul. 28, 2025

(65) Prior Publication Data

US 2026/0027971 A1 Jan. 29, 2026

Related U.S. Application Data

(60) Provisional application No. 63/676,622, filed on Jul. 29, 2024.

(51) Int. Cl.

| | |
|---|---|
| ***B60K 35/231*** | (2024.01) |
| ***B60K 35/10*** | (2024.01) |
| ***B60K 35/235*** | (2024.01) |
| ***B60K 35/28*** | (2024.01) |
| ***B60R 1/00*** | (2022.01) |
| ***B60R 1/23*** | (2022.01) |

(52) U.S. Cl.

CPC .............. *B60R 1/001* (2013.01); *B60K 35/10* (2024.01); *B60K 35/231* (2024.01); *B60K 35/235* (2024.01); *B60K 35/285* (2024.01); *B60R 1/23* (2022.01); *B60K 2360/176* (2024.01); *B60K 2360/191* (2024.01); *B60R 2300/103* (2013.01); *B60R 2300/301* (2013.01); *B60R 2300/307* (2013.01); *B60R 2300/70* (2013.01); *B60R 2300/802* (2013.01)

(58) Field of Classification Search

CPC .................................................... B60K 35/231

See application file for complete search history.

(56) References Cited

U.S. PATENT DOCUMENTS

| | | | | |
|---|---|---|---|---|
| 11,467,401 | B2 | 10/2022 | Richards | |
| 2019/0381937 | A1* | 12/2019 | Rakshit .................. | B60K 35/22 |
| 2022/0396148 | A1 | 12/2022 | Rodrigues et al. | |
| 2022/0396205 | A1 | 12/2022 | Rodridues et al. | |
| 2024/0208420 | A1* | 6/2024 | Satoh .................. | B60K 35/235 |
| 2026/0027971 | A1* | 1/2026 | Weber .................. | B60K 35/231 |

* cited by examiner

*Primary Examiner* — Y Lee

(74) *Attorney, Agent, or Firm* — Arent Fox Schiff LLP

(57) ABSTRACT

A window display system for a vehicle is provided to display blind spot information to an occupant. The system includes a vehicle window with an interior side facing the passenger compartment and an exterior side facing away, a transparent display integrated with the window to present visual information to the occupant, environment sensors mounted on the vehicle to acquire visual data of the exterior environment corresponding to a blind spot region, turn signal sensors operatively coupled to a turn signal to detect activation, and a controller operatively connected to the transparent display, environment sensors, and turn signal sensors. The controller includes a processor and memory storing instructions that, when executed, detect an object in the blind spot region and activation of the turn signal, and in response, cause the transparent display to overlay a highlighted representation of the object on the interior side of the window.

22 Claims, 7 Drawing Sheets

VEHICLE TRANSPARENT DISPLAY SYSTEM AND METHOD

This application claims the benefit of U.S. Provisional Application No. 63/676,622, titled: VEHICLE SAFETY AND CONVENIENCE FEATURES, filed on Jul. 29, 2024. The entirety of the aforementioned application is incorporated by reference herein.

FIELD OF THE INVENTION

Aspects of the present disclosure relate generally to safety and convenience features for a vehicle. Specifically, aspects of the disclosure relate to systems and methods for displaying situational awareness information to vehicle operators and passengers.

BACKGROUND

Drivers In modern vehicles, particularly in heavy-duty and commercial applications, drivers are required to remain aware of dynamic road environments while maintaining focus on the road ahead. For instance, although a variety of safety and convenience features have been introduced, ranging from conventional mirror assemblies to camera-monitor units and heads-up displays, many of these features necessitate the driver to glance away from the road or perform head movements to interpret information. Certain systems, such as blind-spot monitoring systems, are often implemented with audible chimes, LED indicators in mirror housings, or camera feeds on dashboard screens to warn drivers of vehicles in adjacent lanes. Although these approaches can alert the driver to nearby road users, they frequently require the driver to mentally fuse information from multiple sources and typically emphasize the entire scene rather than isolating the hazard. Therefore, improvements to safety and convenience features may be desired.

SUMMARY

A summary of particular aspects of the disclosure is set forth below. It is worth noting that these aspects are presented solely to provide the reader with an overview of certain features and aspects, and these features and aspects are not intended to restrict the scope of this disclosure. This summary does not serve as a comprehensive overview of all contemplated aspects of the disclosure and is not intended to highlight any specific elements of all aspects or define the scope of any or all aspects. The purpose of this summary is to introduce some concepts of one or more aspects in a simplified form as an introduction to the more detailed description below.

Aspects of the disclosure relate to a window display system for a vehicle configured to present blind-spot information to an occupant. The window display system may include a window having interior and exterior sides; a transparent display integrated with the window for presenting visual information; one or more environment sensors to acquire visual data of an exterior blind-spot region; one or more turn-signal sensors to detect activation of a vehicle turn signal; and a controller with a processor and memory storing instructions that cause the controller to detect an object in the blind-spot region, detect turn-signal activation, and, in response, overlay a highlighted representation of the object on the interior side of the window.

In another aspect, the system may further comprise a gaze detector to determine the occupant's line of sight and restrict overlay of the highlighted representation to when the occupant is looking at the transparent display. Furthermore, the transparent display may include a liquid-crystal array layer for varying window transparency and an organic light-emitting diode layer for rendering the highlighted representation. The representation can take the form of a color-coded outline indicating hazard level, and the system can operate in distinct highway and city modes based on vehicle speed, displaying only predetermined hazard levels in highway mode and all detected objects in city mode.

In a further aspect, the disclosure relates to a non-transitory computer-readable medium storing instructions that, when executed by a processor of the window display system, direct the processor to receive visual data from environment sensors, receive turn-signal activation signals, detect an object in the blind-spot region, detect activation of the turn signal, and cause the transparent display to overlay a highlighted representation of the object. The instructions may also control the layered display architecture, apply color-coded outlines, determine vehicle mode, process gaze-detector data, remove or darken background regions to emphasize the highlighted representation, and incorporate data from radar, lidar, steering-wheel, wheel-speed, and Controller Area Network inputs. These and other features will be more clearly understood from the following detailed description and accompanying drawings.

BRIEF DESCRIPTION OF THE DRAWINGS

The novel features believed to be characteristic of aspects of the disclosure are set forth in the description that follows. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein.

DETAILED DESCRIPTION

Figure 1:
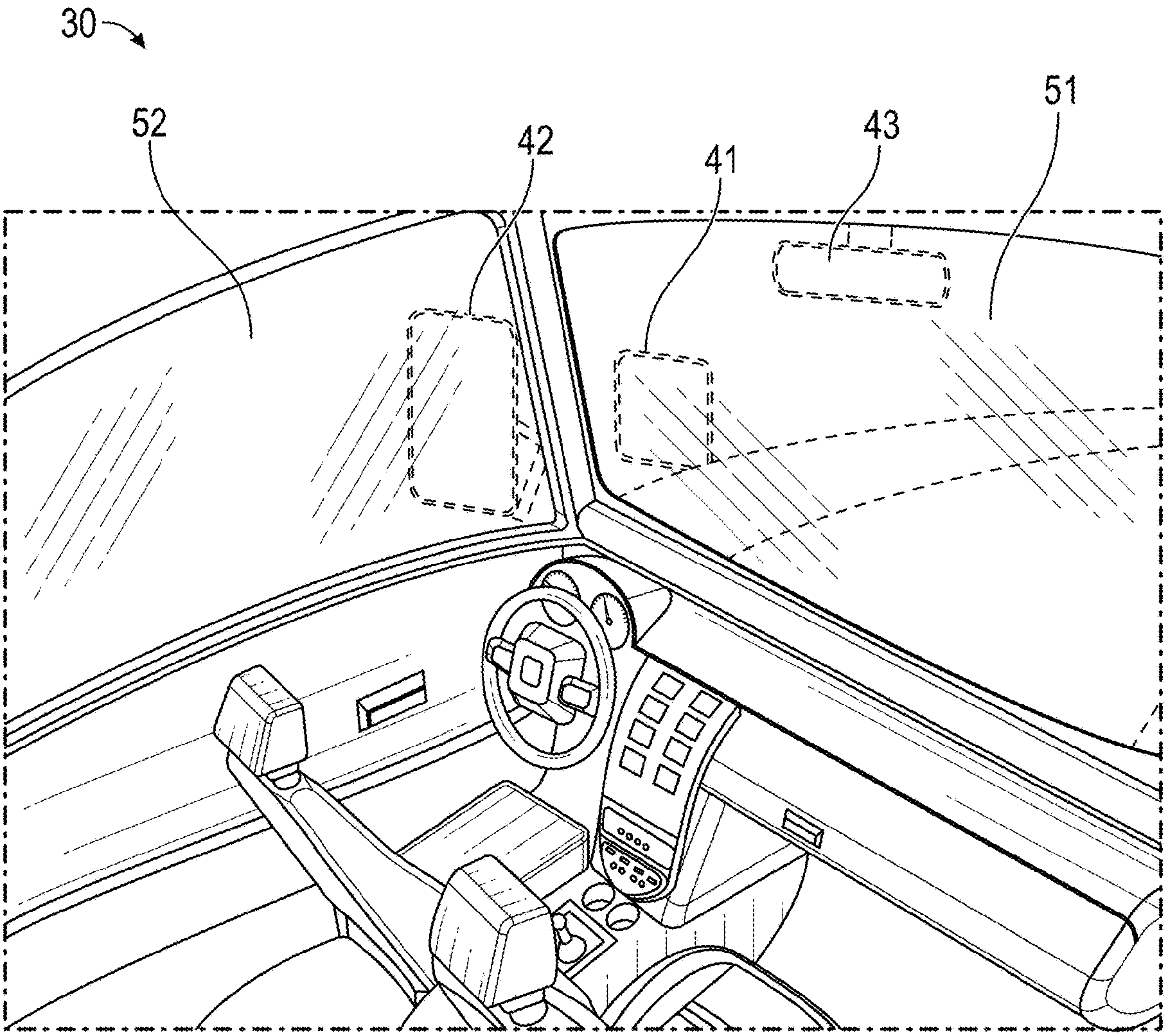
FIG. 1 illustrates an internal view of a vehicle cabin according to aspects of the disclosure.

The following includes examples of definitions of selected terms employed herein. The definitions include various examples and/or forms of components that fall within the scope of a term and that may be used for implementation. The examples are not intended to be limiting.

The term processor, as used herein, may refer to a device that processes signals and performs general computing and arithmetic functions. Signals processed by the processor may include digital signals, data signals, computer instructions, processor instructions, messages, a bit, a bit stream, or other computing that can be received, transmitted and/or detected. A processor, for example, may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term bus, as used herein, may refer to an interconnected architecture that is operably coupled so as to transfer data among computer components within a singular or multiple systems. The bus may be or include a memory bus, a memory controller, a peripheral bus, an external bus, a crossbar switch, and/or a local bus, among others. The bus may also be or include a vehicle bus that interconnects components inside a vehicle using protocols such as Controller Area network (CAN), Local Interconnect Network (LIN), among others.

The term memory, as used herein, may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term sensor, as used herein, can include any device, component, and/or system that can detect, determine, assess, monitor, measure, quantify, acquire, and/or sense something.

The term operable connection, or signal communication as used herein, may include a coupling by which entities are capable of exchanging information or providing and receiving current, in which signals, physical communications, and/or logical communications may be transmitted and/or received. An operable connection may include a physical interface, a data interface and/or an electrical interface.

The term communication network(s) as used herein can include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network(s) can be implemented as or include one or more wireless networks, whether short range (e.g., a local wireless network built using a Bluetooth or one of the IEEE 802 wireless communication protocols, e.g., 802.11 a/b/g/I, 802.15, 802.16, 802.10, Wi-Fi Protected Access (WPA or WPA2) or long range (e.g., a mobile, cellular, and/or satellite-based wireless network; GSM, TDMA, CDMA, WCDMA networks, or the like). The communication network(s) can include wired communication links and/or wireless communication links. The communication network(s) can include any combination of the above networks and/or other types of networks.

The term vehicle, as used herein, may refer to any moving or moveable vehicle that is capable of carrying one or more human occupants and cargo and is powered by an internal combustion engine and/or an electronic battery and/or any form of energy that may be recharged or refueled. The term "vehicle" may include, but is not limited to: trucks, cars, vans, minivans, sport utility vehicles (SUVs). The term "vehicle" may include self-driving vehicles, hybrid vehicles, and electrical vehicles.

The term system, or vehicle system as used herein, may refer to any electronically or otherwise controlled system on a vehicle or related to vehicle operation and/or driver safety or assistance features and may be operable to perform certain actions on components of the vehicle. For example, a system may provide an interface to allow operation by another system or graphical user interaction. The vehicle systems may include, but are not limited to, vehicle steering or wheel angle monitoring systems, vehicle conditioning systems (e.g., systems that operate a windshield wiper motor, a windshield washer fluid motor or pump, a defroster motor, heating, ventilating, and air conditioning (HVAC) controls), vehicle audio systems, vehicle video systems (i.e., cameras), vehicle safety and/or monitoring systems (e.g., proximity monitoring systems, radar, lidar, global positioning system (GPS) tracking and/or mapping systems) and the like, vehicle assistance systems (e.g., lane assist systems, cross traffic detection systems, parking assist systems, lane-keep assist systems, blind spot monitoring and/or intervention systems, pedestrian warning and/or intervention systems, stopped traffic and/or collision warning and/or intervention systems) or the like.

The term window or windows as used herein may for example include the mirrors of the vehicle and any window of a vehicle. A window may for example comprise multiple layers or may be a unitary structure.

As used herein, the term glass refers to any transparent, semi-transparent, or translucent structure, and may include, without limitation: silicas-based window glass, plastic, composites, combinations thereof, or other application-suitable glass materials.

Throughout the disclosure the term hazard or object are used interchangeably however the terms are not intended to be limiting. A hazard or object may be anything in a vehicles environment that may potentially require the driver's attention and/or that may pose a hazard to the driver or vehicle and may include but is not limited to stationary objects, other vehicles, pedestrians, animals and the like.

Reference throughout this specification to one aspect, an aspect, one example or an example means that a particular feature, structure or characteristic described in connection with the embodiment or example may be a feature included in at least example of the present invention. Thus, appearances of the phrases in one aspect, in an aspect, one example or an example in various places throughout this specification are not necessarily all referring to the same example. Furthermore, the particular features, structures or characteristics may be combined in any suitable combinations and/or sub combinations in one or more embodiments or examples.

Throughout the disclosure, the terms substantially or approximately may be used as a modifier for a geometric relationship between elements or for the shape of an element or component. While the terms substantially or approximately are not limited to a specific variation and may cover any variation that is understood by one of ordinary skill in the art to be an acceptable level of variation, some examples are provided as follows. In one example, the term substantially or approximately may include a variation of less than 10% of the dimension of the object or component. In another example, the term substantially or approximately may include a variation of less than 5% of the object or component. If the term substantially or approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the aspects or articles described herein are in an in-use orientation. In some examples, the directional terms are expressed generally with relation to a left-hand coordinate system.

Terms such as a, an, and the, are not intended to refer to only a singular entity, but also include the general class of which a specific example may be used for illustration. The terms a, an, and the, may be used interchangeably with the term at least one. The phrases at least one of and comprises at least one of followed by a list refers to any one of the items in the list and any combination of two or more items in the list. All numerical ranges are inclusive of their endpoints and non-integer values between the endpoints unless otherwise stated.

The terms first, second, third, and fourth, among other numeric values, may be used in this disclosure. It will be understood that, unless otherwise noted, those terms are used in their relative sense only. In particular, certain components may be present in interchangeable and/or identical multiples (e.g., pairs). For these components, the designation of first, second, third, and/or fourth may be applied to the components merely as a matter of convenience in the description.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate elements that share features or function and/or corresponding or analogous elements. In addition, numerous specific details are set forth in order to provide a thorough understanding of the embodiments described herein. However, it will be understood by those of ordinary skill in the art that the aspects described herein can be practiced without all of the specific details described herein and/or with alternative or additional elements that may be known.

As noted above, In modern vehicles, particularly in heavy-duty and commercial applications, known safety and convenience features necessitate the driver to glance away from the road or perform head movements to interpret information. Additionally, the increasing integration of multiple sensor systems has resulted in a proliferation of displays and alerts, which can overwhelm or distract the operator. Certain systems, such as blind-spot monitoring systems, are often implemented with audible chimes, LED indicators in mirror housings, or camera feeds on dashboard screens to warn drivers of vehicles in adjacent lanes. Although these approaches can alert the driver to nearby road users, they frequently require the driver to mentally fuse information from multiple sources rather than providing an indication that isolates the hazard or feature that requires attention. In highway driving, superfluous warnings may desensitize the driver, whereas city driving demands more continuous awareness. Additionally, existing transparent display proposals have struggled to balance visibility, transparency, and brightness when embedded in glass. As a result, improvements are desired to highlight only relevant hazards, adapt to different driving modes, and maintain an unobstructed view of the roadway while providing relevant information in locations where drivers are accustomed to looking to reduce the number of gaze transitions and minimizing eye strain. This disclosure provides solutions that provide situational data directly within the driver's natural field of view without adding complexity or requiring significant head repositioning and/or assist with interpretation and prioritization of multiple road hazards and/or items that require attention thus greatly improving vehicle safety and convenience. Detailed examples of the features that achieve the forgoing objectives and/or provide additional advantages are described in detail below.

Figure 2:
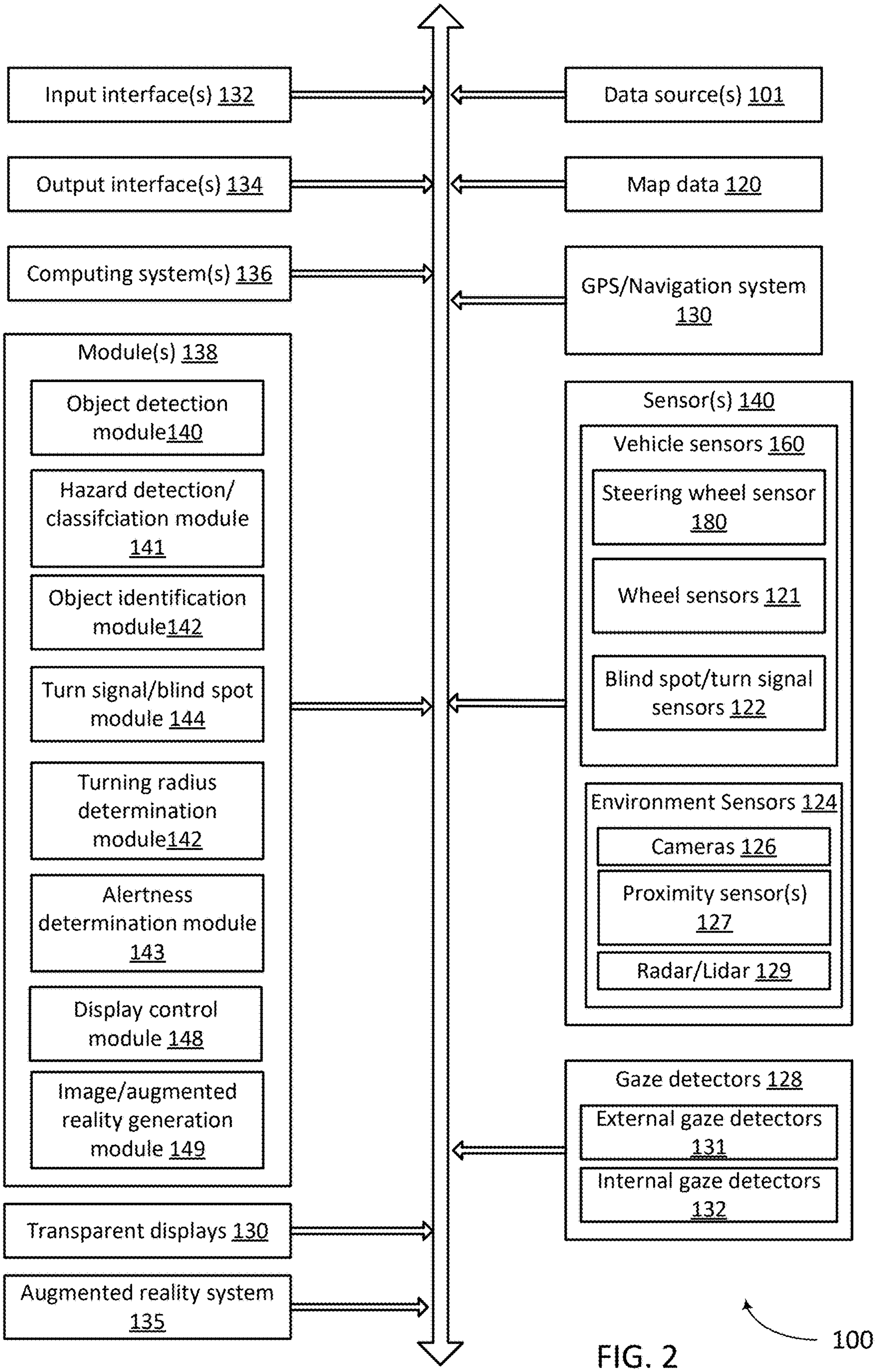
FIG. 2 is a schematic diagram of an example window display system according to aspects of the disclosure.

Referring to FIG. 1, an example of window display system 100 for a vehicle is shown. The window display system 100 can include various elements. Some examples of elements of the window display system 100 are shown in FIG. 2 and are described in detail herein. However, it will be understood that it is not necessary for the window display system 100 to have all of the elements shown in the Figures or described herein. Further, the window display system may include any known elements that are not shown. The window display system 100 can have any combination of the various elements shown in FIG. 2. Further, the window display system 100 can have additional elements to those shown in FIG. 2 and includes additional elements as will be appreciated after reading this disclosure. In some arrangements, any one or combination of the elements shown in FIG. 2 may be omitted. Further, while the elements are shown in a single Figure, any one or combination of the elements may be physically separated by large distances and may communicate via any known wired or wireless communication. In some arrangements, one or more of the elements shown in FIG. 1 may be located onboard a vehicle or in a remote location.

Figure 6:
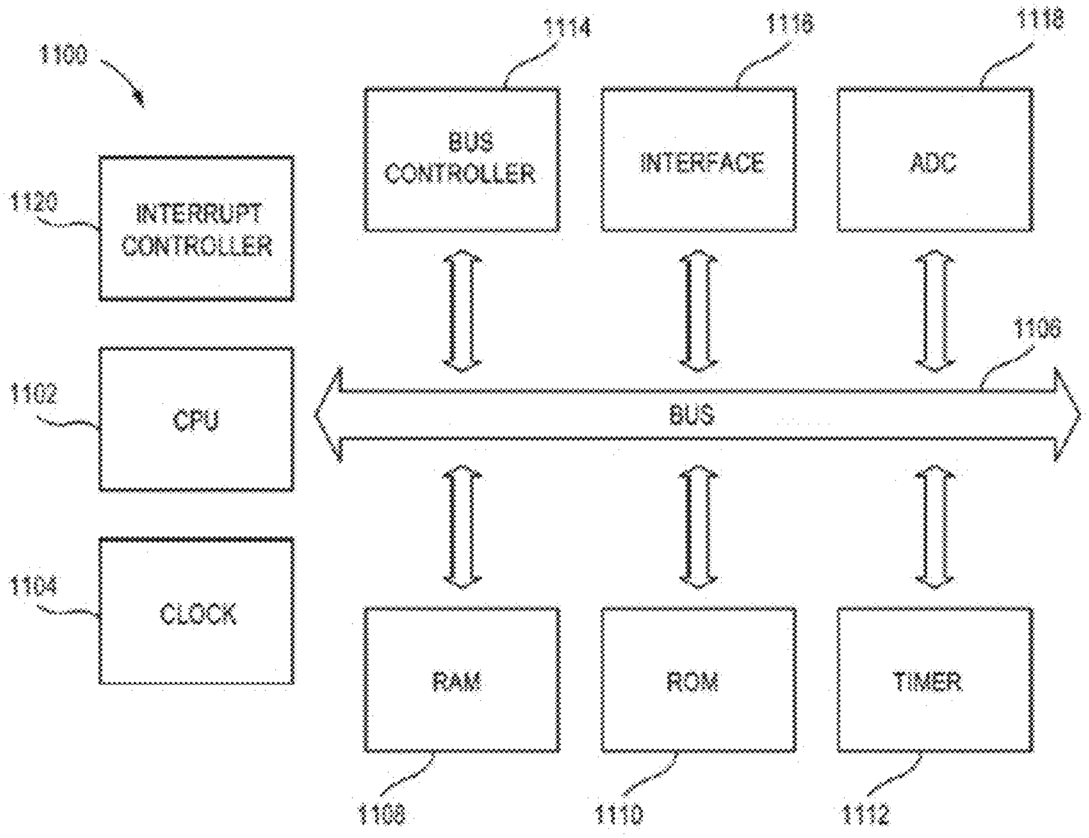
FIG. 6 illustrates an example of an example controller for controlling systems described herein in accordance with aspects of the disclosure.
Figure 7:
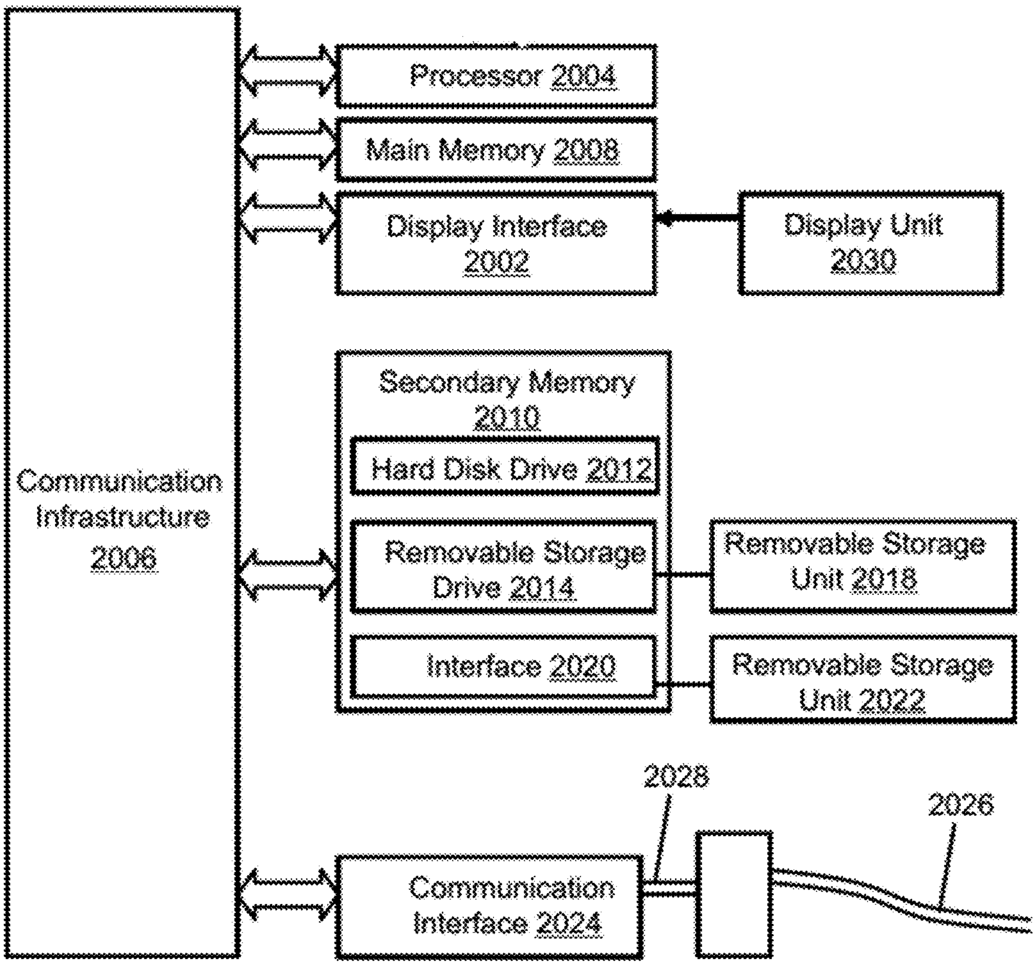
FIG. 7 illustrates an example of a computer system for controlling systems in accordance with aspects of the present disclosure.
Figure 8:
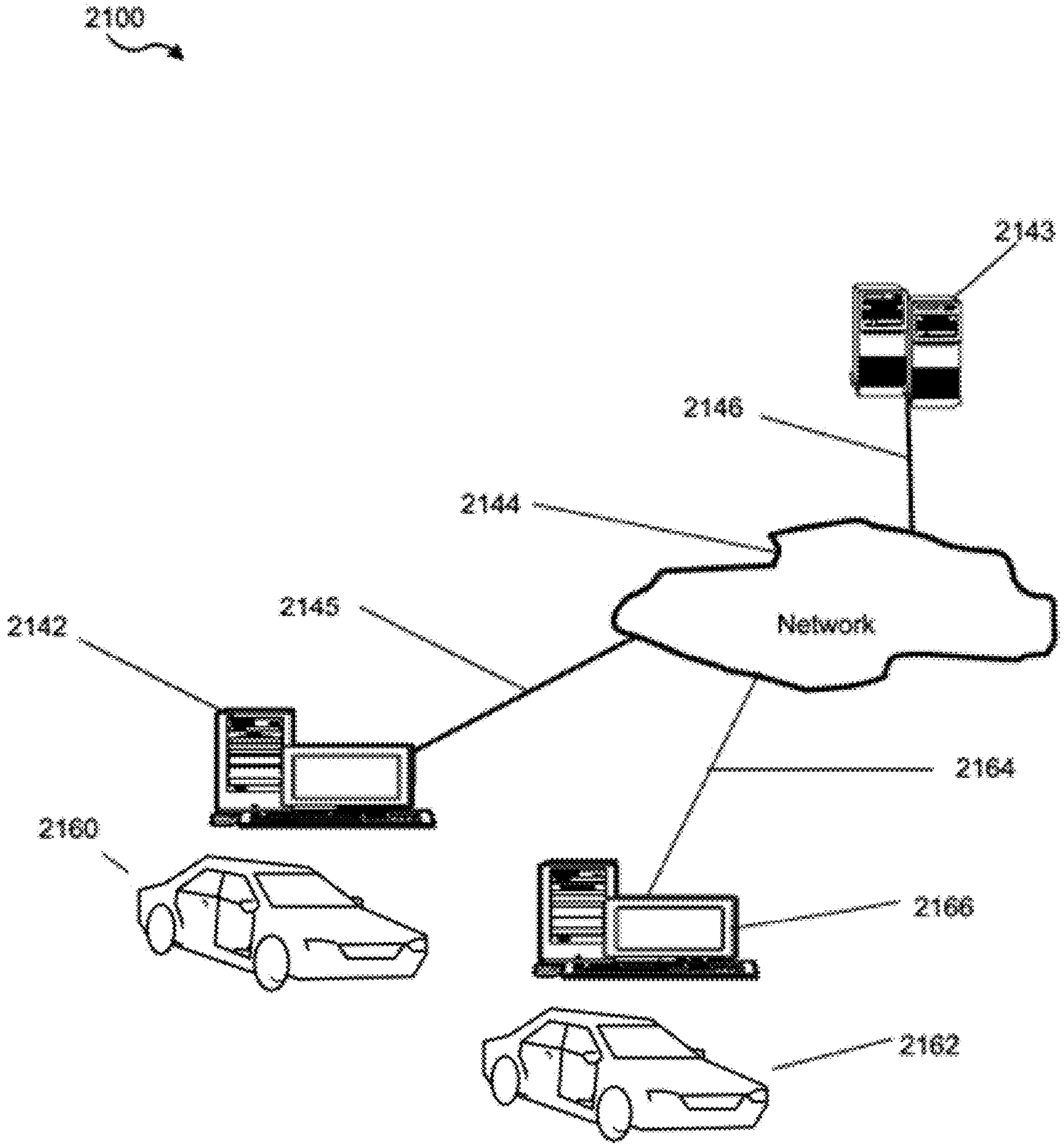
FIG. 8 illustrates a diagram of various examples of networked system components in accordance with aspects of the present disclosure.

The window display system 100 can include one or more power sources (not shown), one or more data stores including map data 120, a navigation system 130, one or more sensors 140, including vehicle sensors 160 (one or more steering wheel sensors 180, wheel sensors 121, and/or one or more turn signal sensors 122) and environment sensors 124 (including one or more cameras 126), one or more gaze detectors 128, one or more transparent display(s) 130, one or more input interface(s) 132, one or more output interface(s) 134, one or more computing and network systems 136 (examples of computing systems are described in further detail with respect to FIGS. 6-8 below), one or more module(s) 138 (including one or more object detection module(s) 140, one or more object identification module(s) 142, one or more turn signal detection module(s) 144, one or more turning radius determination module(s) 146, and/or one or more display control module(s) 148). As described herein, the transparent displays 130 (e.g., shown as displays 42, 41 and/or 42 in FIGS. 1 and 442 in FIG. 4). may be imbedded within or adhered to one or more windows of the vehicle (i.e., 51 and 52 shown in FIG. 1). Further, the transparent displays 130 may be imbedded within or adhered to one or more mirrors (e.g., rearview mirror 52 shown in FIG. 1) of the vehicle.

The various elements of the window display system 100 can be communicatively linked to one another or one or more other element(s) through one or more communication networks. The term communicatively linked, as used herein, can include direct or indirect connections through a communication channel, bus, pathway, or another component or system. The term communication network, as used herein, means one or more components designed to transmit and/or receive information from one source to another. The elements of the window display system 100 can include and/or execute suitable communication software, which enable the various elements to communication with each other through the communication network and perform the functions disclosed herein. Additional examples of computing and network systems are described in further detail below with respect to FIGS. 6-8).

The window display system 100 can include one or more power sources (not shown), as noted above. The power source(s) can be any power source capable of and/or configured to provide sufficient power to the window display system 100 and the elements thereof. For example, the power source(s) can include one or more batteries, one or more fuel cells, one or more generators, one or more alternators, one or more solar cells, and combinations thereof. In some arrangements, the power source(s) can be one or more power sources of the vehicle.

The window display system 100 can include one or more data stores, which may include map data 120, as noted above. The data store(s) can include volatile and/or non-volatile memory. The data store(s) can be a component of the computing systems 136, or the data store(s) can be operatively connected to the processor(s) the computing systems 136 and/or processors associated with the computing systems 136. The data store(s) can be configured to store map data 120, and/or any other data and/or information from one or more elements of the window display system 100. Additional examples of computing systems and controllers are described below with respect to FIGS. 6 and 7.

The map data 120 can include maps of one or more geographic areas. In some instances, the map data 120 can include information or data on roads, traffic control devices, road markings, streetlights, structures, features, and/or landmarks in the one or more geographic areas. The map data 120 can include information about ramps, merging points between the ramps and the main lanes, and geo-fences surrounding the merging points. The map data 120 can be in any suitable form. In some instances, the map data 120 can include aerial views of an area. In some instances, the map data 120 can include ground views of an area, including 360-degree ground views. The map data 120 can include measurements, dimensions, distances, positions, coordinates, and/or information for one or more items included in the map data 120 and/or relative to other items included in the map data 120. The map data 120 can include a digital map with information about road geometry. In one or more arrangements, the map data 120 can include information about the ground, terrain, roads, surfaces, and/or other features of one or more geographic areas. The map data 120 can include elevation data in the one or more geographic areas. The map data 120 can define one or more ground surfaces, which can include paved roads, unpaved roads, land, and other things that define a ground surface. The map data 120 can be high quality and/or highly detailed.

As noted above, the window display system 100 can include a navigation system 130. The navigation system 130 can include one or more mechanisms, devices, elements, components, systems, applications and/or combinations thereof, now known or later developed, configured to determine the geographic location of the vehicle and/or to determine a travel route for the vehicle and/or other vehicles that could affect operation of the vehicle. The navigation system 130 can include one or more mapping applications to determine a travel route for the vehicle. The navigation system 130 can include a global positioning system (GPS), a local positioning system, or a geolocation system. In one or more arrangements, the navigation system 130 can include a GPS, a local positioning system or a geolocation system. The navigation system 130 can be implemented with any one of a number of satellite positioning systems, now known or later developed. Further, the navigation system 130 can use Transmission Control Protocol (TCP) and/or a Geographic information system (GIS) and location services. The navigation system 130 may include a transceiver configured to estimate a position of the vehicle with respect to the Earth. For example, navigation system 130 can include a GPS transceiver to determine the vehicle's latitude, longitude and/or altitude. The navigation system 130 can use other systems (e.g. laser-based localization systems, inertial-aided GPS, and/or camera-based localization) to determine the location of the vehicle.

As noted above, the window display system 100 can include one or more sensors 140. The sensor(s) 140 can detect, determine, assess, monitor, measure, quantify, acquire, and/or sense in real-time. The term real-time, as used herein, can mean a level of processing responsiveness that a user or system senses as sufficiently immediate for a particular process or determination to be made, or that enables the processor to keep up with some external process. The sensor(s) 140 can be operatively connected to the computing systems(s) 136 including processors or data stores therein, the data sources 101, and/or any other elements of the window display system 100. In arrangements in which the window display system 100 includes a plurality of sensors 140, the sensors 140 can work independently from each other. Alternatively, two or more of the sensors 140 can work in combination with each other. In this example, the two or more sensors 140 can form a sensor network.

The sensor(s) 140 can include any suitable type of sensor for completing operations describe herein. The sensor(s) 140 can include one or more vehicle sensors 160, as noted above. The vehicle sensor(s) 160 can detect, determine, assess, monitor, measure, quantify, and/or sense information about the vehicle itself (e.g., position, orientation, speed, etc.). The vehicle sensor(s) 160 can include the steering wheel sensor(s) 180, the wheel sensors 121, and/or the blind spot/turn signal sensor(s) 122. The steering wheel sensor(s) 180 can be configured to collect data and/or information about a steering wheel of the vehicle. For example, the steering wheel sensor(s) 180 can be configured to collect data and/or information about the position of the steering wheel, a steering wheel angle, how much the steering wheel has turned in a specific amount of time, and/or how fast the steering wheel is being turned. In some arrangements, the steering wheel sensor(s) 180 can include one or more rotary position sensors. In some instances, the wheel sensors 121 can be configured to collect data and/or information about the wheels of the vehicle. For example, the wheel sensors 121 can be configured to collect data and/or information about the speed the wheels are spinning, whether the wheels are being turned, and the angle at which the wheels are being turned. The turn signal and/or blind spot sensor(s) 122 can be configured to determine whether a turn signal of the vehicle is activated or deactivated. In some arrangements, the vehicle sensors 160 can be part of other systems typical of vehicles, for example, parking assist systems, lane keeping assist systems, adaptive cruise control systems, etc.

The sensor(s) 140 can also include one or more environment sensors 124. The environment sensor(s) 124 can be configured to detect, determine, assess, monitor, measure, quantify, acquire, and/or sense driving environment data. The term "driving environment data," as used herein, includes any data or information about the external environment in which the vehicle (e.g., vehicle 200 in FIG. 3) is located or one or more portions thereof. The environment sensor(s) 124 can include one or more cameras 126. The camera(s) 126 can be located on the vehicle for example, positioned along one or both sides of the vehicle on the exterior of the vehicle. In some arrangements, the camera(s) 126 can be located in or on an exterior side view mirror of the vehicle or in a location where a side view mirror or mirrors would normally be located. In other examples, the camera(s) 126 could be located on an exterior of the vehicle at a location suitable to show a view that would normally be viewable by side view mirrors and/or rear-view mirrors. Further, the camera(s) 126 could be arranged to provide a top-down or underside view of the vehicle. In other arrangements, the camera(s) 126 can be located in any other suitable location on the vehicle.

Figure 3:
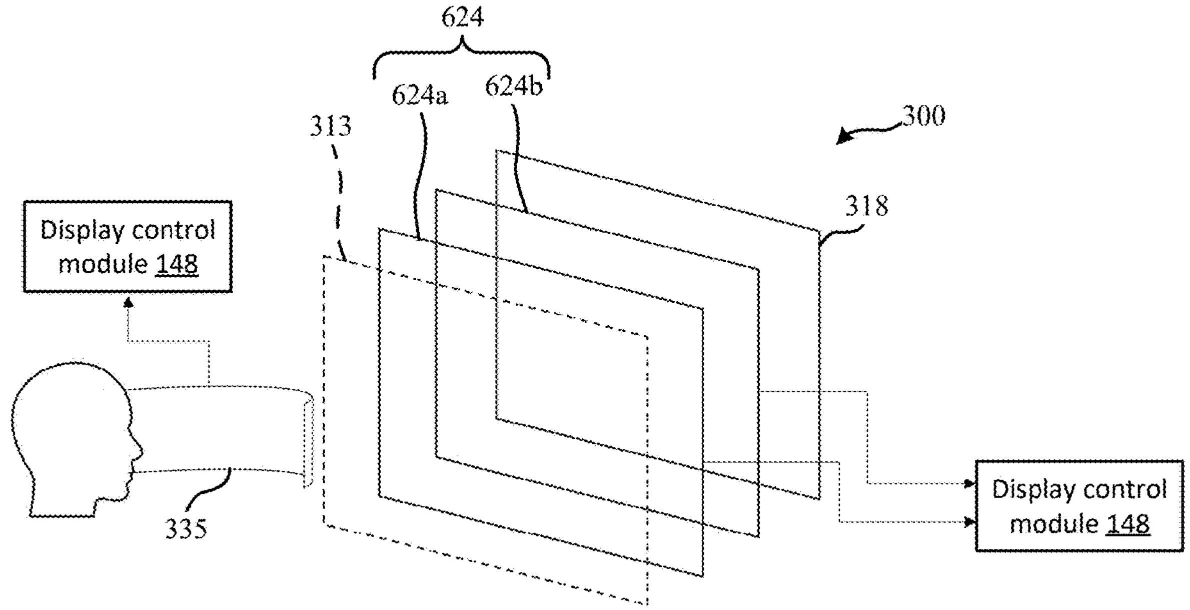
FIG. 3 illustrates an example diagram of a transparent window display system according to aspects of the disclosure.

The camera(s) 126 can be configured to acquire visual data of a portion of the exterior environment of the vehicle (e.g., vehicle 200 in FIG. 3). Specifically, the camera(s) 126 can be configured to acquire visual data of at least one or more of blind spots (e.g., blind spots 266 and/or 267) of the exterior environment of vehicle. For example, the vehicle can include a camera 126 located on the exterior of the vehicle 200 on the driver's side, which can be configured to acquire visual data about a blind spot 266 on the driver's side of the vehicle 200. The vehicle 200 can also include a camera 126 located on the exterior of the vehicle on the passenger's side, which can be configured to acquire visual data about a blind spot 267 on the passenger's side of the vehicle 200. As shown in FIGS. 1 and 3, the driver's side of the vehicle 200 is the left side of the vehicle, and the passenger's side is the right side of the vehicle 200. However, it will be understood that in some arrangements, the driver's side of the vehicle 200 can be the right side of the vehicle, and the passenger's can be the left side thereof. The visual data collected by the camera(s) 126 can include video and/or still images of the blind spot(s). The visual data can be acquired continuously in real-time. The camera(s) 126 can be operatively connected to the computing systems 136. The camera(s) 126 can be any suitable camera and/or other imaging device, for example, one or more wide-angle camera(s), one or more fish-eye camera(s), one or more infrared camera(s), one or more thermal camera(s), and/or one or more camera(s) modified with a lens of a different focal length. In some arrangements, the camera(s) 126 can be part of a perception system typical of vehicles. Specifically, the camera(s) 126 can be included in the vehicle 200 as part of a panoramic view monitor (PVM) for adding driver visibility of the vehicle 200 and the exterior environment of the vehicle 200.

The system 100 can include one or more gaze detectors 128, which may include one or more internal gaze detectors 132 and one or more external gaze detectors 131, which in some examples may utilize any one or combination of the cameras 126 described above. The internal gaze detectors 132 can be located in the passenger compartment of the vehicle 200. The gaze detectors 128 can be operatively connected to the computing systems or processors therein. The internal gaze detector 132 can be configured to detect one or more characteristics and/or movements of the driver. For example, the internal gaze detector can detect movements of the driver's head and/or movements of the driver's eyes. Using this information, the internal gaze detectors can determine the line of sight of the driver, for example, the direction in which the driver is looking, and/or the internal gaze can determine if the driver moves his or her head to look toward a blind spot of the vehicle. The gaze detectors can include any suitable technology, now known or later developed, configured to perform these processes. In some arrangements, the internal gaze detector(s) 128 can be part of driver monitoring systems typical of vehicles, for example, fatigue detection systems, security systems, etc.

The external gaze detectors 131 can be operatively connected to the computing systems or processors therein. The external gaze detector 132 can be configured to detect one or more characteristics and/or movements of the drivers of surrounding vehicles (e.g., vehicles 220, 230, 250, and/or 260) and/or pedestrians, cyclists, or motorcycle drivers. For example, the external gaze detector 131 can detect movements of driver/operators/pedestrian's head and/or movements of their eyes. Using this information, the external gaze detectors can determine the line of sight of external driver/operators/pedestrians, for example, the direction in which the external drivers/operators/pedestrians are looking to help determine their level of situational awareness and/or to determine if they are aware of the presence or location of the vehicle 200. The gaze detectors can include any suitable technology, now known or later developed, configured to perform these processes. In some arrangements, the external gaze detector(s) 131 can communicate the internal gaze detectors and/or sensors of surrounding vehicles (i.e., vehicles 220, 230, 250, and/or 260) and their driver monitoring systems typical of vehicles, for example, fatigue detection systems, security systems, etc.

As noted above, the transparent display system 100 can include one or more transparent display(s) 130. The transparent display(s) 130 can form at least a portion of any of the windows and/or mirrors of a vehicle. For example, as shown in FIG. 1, the window(s) 52 and/or 51 of vehicle 30 (which may share features with or may be analogous with vehicle 200 in FIG. 5). For example, a driver's side window 52 can include on or more driver's-side transparent display 42 and a passenger's side window (hidden from view) can include a passenger's side dual-sided transparent display that shares features with or is similar to the display 42 and/or left side windshield transparent vehicle display. While the dual-sided transparent displays are described herein in connection with the driver's side window 51 and/or the windshield 52, it will be understood that any one or combination of the transparent displays described above can be used in connection with any other window of the vehicle 200, including the front windshield, the rear side windows and/or the rear windshield. Further, the transparent displays may be integrated into rear view mirrors of the vehicle.

Referring to FIG. 1, the windows with transparent displays can include exterior sides (e.g., sides facing outwards away from the vehicle cabin) and interior sides (e.g., sides facing inwards towards the vehicle cabin as shown in FIG. 1). In some instances, the interior of any one or combination of the windows can be substantially parallel to the exterior of the respective window. The exterior side and/or the interior side can include a surface of the window, for example, a surface of a glass pane. Alternatively, the exterior side and/or the interior side can be separate window components, for example, separate glass panes. The window(s) described herein can be made of any suitable material, now known or later developed. The windows described herein can have any suitable size, shape, and/or configuration. The windows can include one or more layers to form a substrate and the substrate may include features of the transparent display (e.g., pixels and/or light—emitting portions).

In some examples the transparent displays may be incorporated between window layers or panels and/or may be incorporated into or otherwise disposed on an inner or outer surface of a window. As illustrated in FIG. 3, any one of the transparent displays described herein may be incorporated between window layers or panels that form a substrate, such as an outer glass 318 and an inner glass 313. The display screen 300 is not limited by the type of surfaces to which it may be attached or between which it may be placed. The outer glass 318 may be the structural portion of a window formed of glass, and the inner glass 313 may be a protective layer for the display screen 624.

The transparent display(s) (e.g., 42, 41, and/or 43 in FIGS. 1 and 442 in FIG. 4) can be configured to display relevant visual information so that it is visible to a viewer inside of the cabin of the vehicle. The visual information 33 can be displayed to an occupant of the vehicle 200, for example, the driver of the vehicle.

One or more liquid crystal array layer(s) 624*b* may be operatively placed next to or near the outer glass 16 and include a plurality of liquid crystal pixels. Each liquid crystal pixel of the liquid crystal array layer 624*b* can vary in transparency, from substantially clear to substantially opaque. One of relevant skill in the art will recognize the mechanism for varying the darkness of the liquid crystal pixels, which is generally changed as the crystals twist in response to varying voltage applied to specific pixels.

One or more transparent light emitting layer(s) 624*a* may be operatively placed between the liquid crystal array layer(s) 624*b* and the optional inner glass or protective layer 313. The light emitting layer(s) 624*a* include a plurality of light emitting pixels. Both the liquid crystal array layer(s) 624*b* and the transparent light emitting layer(s) 624*a* are flexible, such that the display screen 300 may be curved. The combined one or more transparent light emitting layer(s) 624*a* and light emitting layer(s) 624*a* of the display screen 300 creates a display that can be viewed by the driver and/or passenger(s) within the vehicle but can also be controlled to vary in transparency for an unimpeded view through window when desired.

The liquid crystal array layer(s) 624*b* and the light emitting layer(s) 624*a* of the transparent display screen 300 each include a high number of pixels. Depending on the size of the window, there may be thousands of pixels in each layer. The transparent light emitting layer(s) 624*a* may be an organic or inorganic layers. The light emitting layer(s) 624*a* may be formed from, for example and without limitation, organic light emitting diode (OLED), or inorganic light emitting diode. Those skilled in the art will recognize types and configurations of the light emitting layer systems that may be used for the light emitting layer(s) 624*a*. The light emitting layer(s) 624*a* may include a red, green, blue, white diode matrix that emits light through the visible spectrum. The transparent light emitting layer(s) 624*a* may utilize transparent conductive layers, light emission sources that provide light in specific color wavelengths without needing an external light source.

Figure 5:
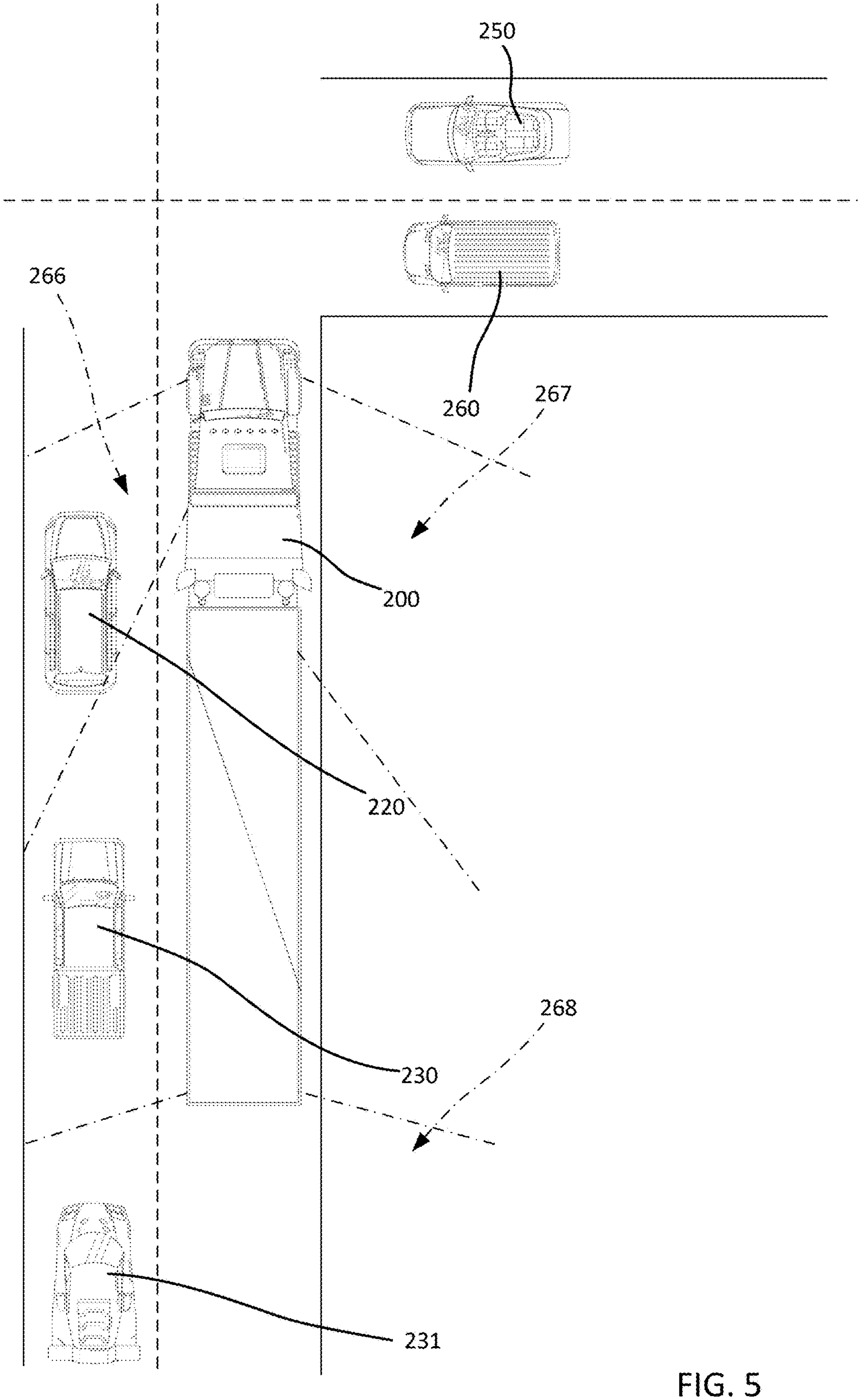
FIG. 5 illustrates examples of features of the systems and methods described herein.

As noted above, one of skill in the relevant art would understand the features of the display screen 300 described above and thus fine detail is not provided here. It is noted that the display screen 300 in FIG. 5 is a schematic and those with skill in the relevant art would understand that the display screen 300 may additionally include one or more anode and cathode layers, in addition to the emissive layer along with additional relevant layers such as one or more polarizing filter layers. Contrast for light emitting layer(s) 624*a* may be achieved by darkening a background of the display screen 300. Such darkening may be provided by liquid crystal array layer(s) 624*b*.

A control system or controller (e.g., display control module(s) 148 as described above) may be operatively in communication with the liquid crystal array layer(s) 624*b* and the light emitting layer(s) 624*a* of the transparent display screen 300 may be configured to control operations and provide relevant power to portions thereof. The controller 148 may include any combination or additional features to those described below with respect to FIGS. 6-8 and may communicate with or include any combination or all of the window display system 100 features described above.

As noted above, in some examples, an apparatus or system according to aspects of the disclosure may include one or more of the aforementioned transparent displays (e.g., as described with respect to FIG. 3) in windows of a vehicle. In one example, the system may provide a live feed from the camera(s) 126 described above and may serve the function ordinarily served by mirrors but with improvements thereof. For example, a left-side view mirror display 42 (FIG. 1) may for example transpose a video feed or graphics as an overlay to the conventional left side rear view mirror of the vehicle. In other words, the display 42 may be configured and positioned to be viewed-through by a user to display auxiliary images and/or enhance images that are reflected from the conventional left-side rear view mirror. In one example implementation, the displays 42 may remain semi-transparent and may cast a color or indicator, that from a driver's perspective, highlights the reflected image in the mirror. For example, with reference to FIG. 5, if a vehicle 230 is viewable in a left side rear-view mirror of vehicle 200, the display 42 may transmit an image or highlight to the driver indicating that it is unsafe to change lanes. For example, the display 42 may overlay the image of the vehicle 230 in red or may provide a blinking image over the vehicle 230. On the other hand, if a vehicle 231 is determined by the window display system 100 to be behind the trailer of vehicle 200, the display may either not overlay the image of vehicle 231 (e.g., may remain completely transparent) and/or may highlight or otherwise indicate that it is safe to change lanes. For example, the display 42 may overlay the image of the vehicle 231 in green if the vehicle 231 is not of concern or risk of collision. Further, if a vehicle 220 is in the blind spot 266 of the vehicle 200, the display 42 may display a full image overlay of the vehicle and highlight the image of the vehicle in any of the ways described above. Thus, even if a vehicle would not ordinarily be visible in the conventional left side rear view mirror, the image is nonetheless overlayed to indicate to a driver that a vehicle is in blind spot 266.

Figure 4:
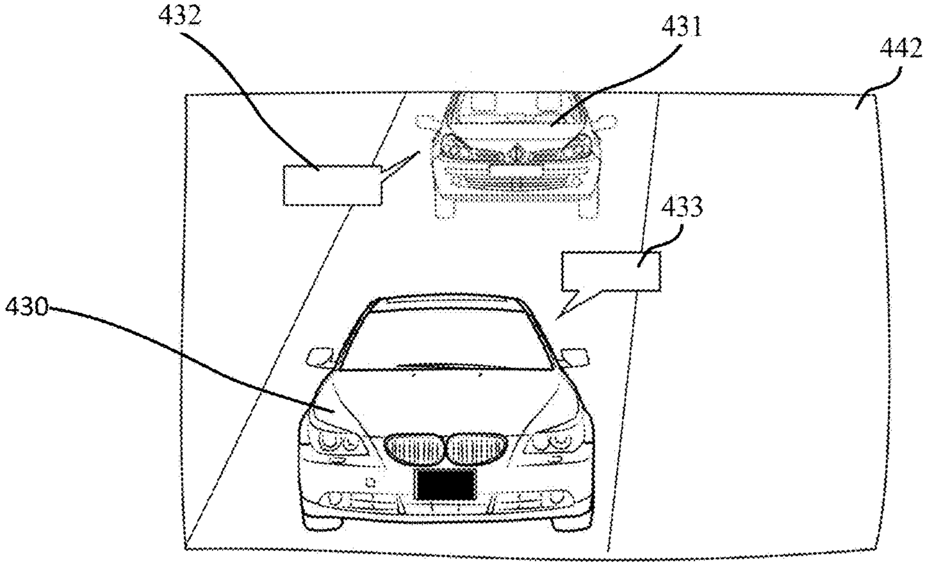
FIG. 4 illustrates an example view through a transparent window display and/or mirror system according to aspects of the disclosure.

FIG. 4 shows one example of a view projected by or viewed through a transparent display 442 according to aspects of the disclosure. In one example operation of the window display system 100, if a vehicle 430 is viewable in a left side rear-view mirror of vehicle 200, a transparent display or part of a transparent display 442 may transmit an image or highlight to the driver indicating that it is unsafe to change lanes. For example, the display 442 may overlay the image of the vehicle 430, may display the vehicle 430 in in red or may provide a blinking image over the vehicle 430. The system may further darken (i.e., via the liquid crystal array layer 624*b*) and/or remove any background (i.e., the lane lines, second vehicle 431 and/or any unshown environmental features) and only show the vehicle 430 to ensure that a driver focuses on only the vehicle or other hazard and is not distracted by surroundings.

In another example, the vehicle of interest 430 may be enlarged to further emphasize the vehicle 430 and ensure a driver is focused on a potential hazard and not surroundings that are determined by the window display system 100 to not pose a hazard. On the other hand, if a vehicle 431 is determined by the window display system 100 to be behind the trailer of vehicle 200 and/or not determined to be a potential hazard or collision risk, the display may either not overlay the image of vehicle 431 (e.g., may remain completely transparent) and/or may highlight or otherwise indicate that the vehicle 431 does not pose a hazard or require attention (e.g., allowing a driver to change lanes). For example, the display 442 may overlay the image of the vehicle 431 in green or another color, may darken the image of the vehicle 431 and/or may omit or otherwise not show the vehicle 431 altogether. As noted above, if a vehicle 220 (FIG. 5) is in the blind spot 266 of the vehicle 200, the display 42 may display an image overlay of the vehicle and highlight the image of the vehicle in any of the ways described above. Thus, even if a vehicle would not ordinarily be visible in the conventional left side rear view mirror, the image is nonetheless overlayed to indicate to a driver that a vehicle is in blind spot 266.

In some aspects of the disclosure, the described transparent display may be in the rear-view mirror of the vehicle either as a substitute or in combination with the aforementioned configuration. For example, a left-side view mirror may include the display which may for example transpose a video feed or graphics to supplement the conventional left side rear view mirror of the vehicle. Thus, the display may be configured to display auxiliary images and/or enhance images that are reflected from the conventional left-side rear view mirror. In one example implementation, the display may remain semi-transparent and may cast a color or indicator that from a driver's perspective highlights the reflected image in the mirror. For example, with reference to the abovementioned example, if a vehicle 230 and/or 430 is viewable in a left side rear-view mirror of vehicle 200, the display in the mirror may display an image or highlight to the driver indicating that it is unsafe to change lanes. For example, the display 42 may overlay the image of the vehicle 230 and/or 430 in red or may provide a blinking image over the vehicle 230 and/or 430. On the other hand, if a vehicle 231 and/or 431 is determined by the window display system 100 to be behind the trailer of vehicle 200 or to not be a concern or hazard, the display may either not overlay the image of vehicle 231 and/or 431 (e.g., may remain completely transparent) and/or may highlight or otherwise indicate that vehicle 231 and/or 431 are not of concern (e.g., it is safe to change lanes). For example, the display may overlay or display the image of the vehicle 231 and/or 431 in green, may shrink the size of the displayed vehicle and/or may darken or even omit the view of the vehicle 231 and/or 431. Further, if a vehicle 220 is in the blind spot 266 of the vehicle 200, the display may display an image of the vehicle 266 provided by the one or more camera(s) 126 and/or highlight the image of the vehicle in any of the ways described above. Thus, even if a vehicle would not ordinarily be visible in the conventional left side rear view mirror, the image of vehicle 220 is nonetheless shown in the rear-view mirror. It is noted that while specific examples of operations are described above, one of skill in the art would understand implementations of the system based on the description herein as applicable to other obstacles and scenarios. For example, similar features may be implemented for pedestrians, animals, and/or other potential hazards or environmental features encountered during use of the vehicle 200.

In some examples of the disclosure, the left-side view mirror display 42 (FIG. 1) may be intended as a substitute for a conventional rear-view mirror. In this example, the display 42 may provide a video feed or graphics at a location to mimic the location of a conventional left side rear view mirror of the vehicle. In other words, the display 42 may be located on a left-side window of a vehicle and may be configured so that it is viewed by a driver as though it is a conventional rear-view mirror. In one example implementation, the display 42 may remain semi-transparent or even completely transparent when objects such as vehicles are not detected in the vicinity of the vehicle 200. In the same example, the display 42 may become opaque or semitransparent and/or display an image to the driver when objects of interest are determined to be in the vicinity of the vehicle 200. For example, if vehicles are not present around the vehicle 200 (i.e., vehicles 220, 230 and 231 are not present and no other vehicles are in lanes that are adjacent the vehicle 200), the display 42 may be transparent or semi-transparent since the window display system 100 determines that no surroundings on the left-side of the vehicle 200 require a driver's attention. However, if a vehicle is present, is determined to be approaching or has approached, and/or is being passed by the vehicle 200 and/or if any other aspect of the surroundings are determined by the window display system 100 to require the driver's attention, the display 42 may become opaque or semi-opaque and/or may display the relevant information to the driver. For example, if a vehicle 230 is located as shown in FIG. 5 with respect to the vehicle 200, the display 42 may display an image or highlight to the driver that it is unsafe to change lanes. For example, the display 42 may show a camera feed image of the vehicle 230.

Further, additional indicators to warn the driver may be added to the camera feed display. For example, the vehicle 232 may have a red outline, or may be shown in red and/or a blinking image may be displayed over the image of the vehicle 230. On the other hand, if a vehicle 231 is determined by the window display system 100 to be behind the trailer of vehicle 200, the display may either not display the image of vehicle 231 until it is determined that the vehicle 231 may prevent a hazard (e.g., the display 42 may remain completely transparent) and/or the display may become semi-transparent or opaque and/or may display the vehicle 231 indicating that while not an immediate hazard, attention should be given to the vehicle 231. Further, the window display system 100 may highlight or otherwise indicate that while vehicle 231 is present it is safe to change lanes. For example, the display 42 may overlay or outline the image of the vehicle 231 in green. If a vehicle 220 is in the blind spot 266 of the vehicle 200, the display 42 may display or blink an image overlay of the vehicle and highlight the image of the vehicle in any of the ways described above. The highlights or indicator may intensify and/or the system may provide audible noise in conjunction with the image if for example the window display system 100 determines that the vehicle operator is intending or is in the process of changing lanes with a vehicle therein (i.e., vehicles 220 and/or 230).

In one example, if the vehicle control system determines that a driver is unaware of the vehicles 220 and/or 230 (i.e., due to the internal gauze detectors 132 and/or the blind spot/turn signal sensors(s) 122 and/or steering wheel sensor 180) the system may intervene and may provide a counterforce to the steering wheel to prevent a the vehicle 200 from colliding with another vehicle. It is noted that while specific examples of operations are described above, one of skill in the art would understand implementations of the system based on the description herein as applicable to other obstacles and scenarios. For example, similar features may be implemented for pedestrians, animals, and/or other potential hazards or environmental features encountered during use of the vehicle 200.

In another aspect of the disclosed system that may be usable with any combination of the features described herein, the system may further utilize any one or combination of the transparent vehicle displays (i.e., 41, 42, and/or 43) to show different relevant views for providing improved situational awareness to the driver. For example, the left side view mirror image may be configured to show (or temporarily show when necessary) a side view of the vehicle looking down the left side of vehicle 200 (e.g., a view that would show vehicles 230 and/or 231 in FIG. 5). A left side windshield transparent vehicle display 41 may show a camera feed and/or any of the indicators and enhancements described herein either constantly or when needed and may be configured to show a side view of a vehicle cab and/or forward of the vehicle drivers seat (e.g., a zone indicated by reference 266 in FIG. 5). It is noted that while the right side of the vehicle 30 is not shown in FIG. 1, similar or identical (e.g., substantially mirror image transparent displays may be located on the right side of the vehicle 30 as well. A rear-view mirror transparent display 43 may show a video feed with any of the enhancements or safety features described herein of the rear of a vehicle as indicated by zone 268 in FIG. 5.

As noted above, FIG. 4 shows one example of a view of a displayed view and/or viewed through view of a transparent display 442. In one example operation of the window display system 100, if a vehicle 430 would typically be viewable in a left side rear-view mirror of vehicle 200 and/or is in zone 266 (FIG. 5) and/or is along the left side of the vehicle 200, a transparent display or part of a transparent display 442 may transmit an image or highlight to the driver indicating that the vehicle 430 poses a hazard (e.g., it is unsafe to change lanes). For example, the display 442 may display the image of the vehicle 430 in the vehicle left side window or windshield, and may display the vehicle 430 in in red or may provide a blinking image over the vehicle 430. The system may further darken (i.e., via the liquid crystal array layer 624*b*) and/or remove any background (i.e., the lane lines, second vehicle 431 and/or any unshown environmental features) and only show the vehicle 430 to ensure that a driver focuses on only the vehicle or other hazard and is not distracted by surroundings. In another example, the vehicle of interest 430 may be enlarged in the transparent display 442 to further emphasize the vehicle 430 and ensure a driver is focused on a potential hazard and not surroundings that are determined by the window display system 100 to not pose a hazard. On the other hand, if a vehicle 431 is determined by the window display system 100 to be behind the trailer of vehicle 200 or not pose a potential hazard, the display may either not display the image of vehicle 431 (e.g., may remain completely transparent) and/or may highlight or otherwise indicate that the vehicle 431 does not pose a hazard or require attention (e.g., allowing a driver to change lanes). For example, the display 442 may display the image of the vehicle 431 in green or another color, may darken the image of the vehicle 431, may shrink the size of the vehicle 431 on the display 442 and/or may omit or otherwise not show the vehicle 431 altogether. As noted above, if a vehicle 220 (FIG. 5) is in the blind spot 266 of the vehicle 200, the display 42 may display an image overlay of the vehicle and highlight the image of the vehicle in any of the ways described above. Thus, the window display system 100 may not only display views that would ordinarily be seen through mirror with the enhancements described herein, but may also show a view of hazards that would not ordinarily be visible in the conventional left side rear view mirror (e.g., a blind spot 266).

It is noted that while specific examples of operations are described above, one of skill in the art would understand implementations of the system based on the description herein as applicable to other obstacles and scenarios. For example, similar features may be implemented for pedestrians, animals, and/or other potential hazards or environmental features encountered during us of the vehicle 200.

The aspects described above may be particularly advantageous when driving at night. Since in some aspects, images of vehicles on the transparent display screens are not reflections but are instead video feeds, glare from vehicle headlights may be reduced and/or other image enhancements may be made (e.g., increased contrast, increased overall scene brightness) by the window display system 100 to allow for improved safety and awareness to a driver operating a vehicle at night.

It is noted that while examples are provided above of transparent displays providing feeds of the rear or sides of vehicle 200, a transparent display, either used in conjunction with or as an alternative to the aforementioned transparent screens may provide a front view and may be part of the windshield of the vehicle. For example, the transparent screen or screens may provide a constant or temporary image indicating hazards as described above. In some examples, hazards may be projected and/or overlaid by a graphic highlighting, by a suitable color, by a suitable brightness, through a suitable contrast, by additional symbols or markings, by an appropriate animation or the like. Hazard objects can be identified, for example, by a red warning shape such as a triangle if a potential front collision is detected or if an object or other hazard is detected. In another example, the potential hazard can be color-coded based on the perceived danger. For examples, hazards or objects that are determined to be a low-level hazard may be highlighted or overlayed in green. Hazards or objects that are determined to be mid-level hazards may be highlighted or overlayed in yellow. High-level hazards that require immediate attention may for example be highlighted or overlayed in red. Further, as a hazard or object is determined to become more hazardous (i.e., as the vehicle 200 or the object or hazard comes approaches), the color of the highlight or overlay may shift from green to yellow to red and may progressively change shades as the hazard or object is identified. The aforementioned aspects allow less driver distraction because a driver can gauge at a quick glance how much attention the hazard or object requires.

In another aspect of the disclosure, the aforementioned windshield transparent display may show a view through the hood of the vehicle 200. For example, when viewing the hood of the vehicle 200 through the windshield, the transparent display may show an image or semi-transparent image with a video feed of a view "through" the hood showing a view that would otherwise be blocked by the hood of the vehicle. Aspects described above are usable with this feature as well. For example, the display may be completely transparent to the drive when no objects or hazards are present in front of the vehicle 200 that could be blocked by the hood. When an object or hazard that may be blocked by the hood is present, the transparent display may show an image or feed of the object or hazard. This feature may include any one or combination of the aspects described above. For example, the level of hazard or attention required may be determined by the window display system 100 and the image may be modified accordingly to signify to a driver that an object or hazard requires attention.

In any one of the examples above, the operation of any one or combination of the transparent displays may have different profiles or modes and may be adjustable by a driver, for example via a interface or graphical use interface as described in further detail below. In one example, the behavior of the transparent displays (and when images are shown or not shown thereon) may be modified based on a vehicle setting. For example, in a highway mode, the transparent displays may turn-on less often and only for situations that require immediate attention or for objects or vehicles that are judged by the window display system 100 to have a higher potential to be a hazard. In a city mode, the transparent displays may be configured to turn on more frequently and/or stay on constantly to ensure that a driver is fully aware of their surroundings and/or in situations (such as in a city) where there are more potential hazards. In some examples, the switching from the aforementioned city mode and aforementioned highway mode may occur automatically based on the speed of the vehicle and/or based on the number of detected vehicles, objects and/or potential hazards detected by the window display system 100.

In another aspect of this disclosure, the window display system 100 may utilize the one or more gaze detectors 128 to determine if other drivers or pedestrians could pose a hazard. For example, the window display system 100 may analyze the eye behavior or head position of other drivers or pedestrians either via the one or more gaze detectors 128 or the cameras 126 via the alertness determination module 143. The alertness determination module may utilize the cameras on the vehicle 200 to read eye and/or head movements of other drivers or pedestrians and/or may communicate with and analyze data provided by the sensors or cameras of networked vehicles utilizing the network features described in further below.

The alertness determination module 143 may recognize that the driver of another vehicle (e.g., vehicles 250, 260, 220, 230, 231 in FIG. 5, and/or vehicles 430 and/or 431 in FIG. 4) is not fully aware of their surroundings and/or may pose a danger to those in the vicinity of their vehicle due by analyzing video feeds, still photos, and/or lidar or other sensors for any one or combination of a head position that is indicative of another driver or pedestrian not being aware of their surroundings (e.g., head turned away from vehicle 200 for over a threshold period of time) specific eye movement which exceeds the pre-determined threshold criteria (e.g., determining that a driver or pedestrians eyes have not focused on vehicle 200 and/or shaking or nystagmus symptoms of the eye and/or any other behavioral indication that can signify the presence of a physical condition which could severely inhibit that person's ability to handle tasks such as driving or even awareness of their surroundings).

Once a potentially dangerous or unaware driver is detected by the window display system 100, any one or a combination of the transparent displays described above may be utilized to indicate to the driver that the vehicle or pedestrian requires extra attention. For example, the transparent display may highlight or otherwise display a message to the driver that overlays the image of the vehicle seen by the driver through the windshield or side windows and/or the rear-view mirrors (if present). In one example implementation, the image of the vehicle seen through the window or mirror may be highlighted in red or may be overlayed with a stationary and/or blinking image or message. In one example, a message 432 and/or 433 (FIG. 4) may be added to the displayed image of the vehicle (e.g., vehicle 430 and/or 431) and/or may be overlayed or otherwise projected so that the message 432 and/or 433 is viewable or otherwise identifiable as associated with the particular vehicle or pedestrian through the vehicle window by the driver.

Additional aspects of the disclosure relate to an augmented reality system usable to provide driver alertness and/or identify hazards utilizing the systems and methods described herein. In one aspect, one or more of the transparent displays described above may be utilized to provide virtual mirrors that to the driver appear in the location of typical mirror of a vehicle (i.e., as side-mirrors, hood mirrors, and/or rear-view mirrors). In some aspects of the disclosure, an augmented reality system 135 may utilize one or more of the transparent displays and/or eyewear and/or additional transparent display 335 (FIG. 3) to provide three-dimensional (3d) or virtual images to a driver. In some aspects, the window display system 100 may utilize the internal gaze detectors 132 to update the virtual images seen by a user based on the head position and/or eye position of the driver. Further, the window display system 100 may utilize the radar/lidar 129 and the GPS/navigation system 130 and map data 120 to provide an augmented reality 3d view of the vehicle surroundings and provide additional data related to vehicles, pedestrians, and other hazards or obstacles as described above.

In one aspect of the disclosure, the window display system 100 may further augment or otherwise provide additional image data to a driver. For example, the window display system 100 may simplify vehicles, objects, and/or hazards into cartoon-like or simplified images to further reduce driver distractions or to otherwise ensure a driver is aware of their surroundings. The system may augment messages, alerts, and/or icons onto images viewable through the window(s) and/or mirror(s). For example, with reference to FIG. 4, the window display system 100 may provide pop-up icons or messages 432 and/or 433 that provide data related to objects, vehicles, and/or pedestrians surrounding the vehicle 200. For example, the pop-up icons or messages may be related to vehicle speed and/or distance and may either display the speed and/or distance or another visual indication of a speed and/or distance. For example, a vehicle approaching from behind the vehicle 200 at a higher speed (i.e., higher than the speed limit or higher than the speed of vehicle 200) may display a red pop-up and/or a message such as "high-speed," likewise, if the vehicle 200 is approaching a vehicle that is comparatively slower than vehicle 200, the display may provide a pop-up in red and/or message such as "slow-moving-vehicle." It is noted that while specific examples are noted above, any type of displayed message and/or information that may improve driver safety and/or awareness is contemplated in this disclosure.

As noted above, as part of or incorporating various features of the vehicle and window display system 100 described herein, one or more microcontrollers may be implemented for carrying out various operations in accordance with aspects of the present invention. Various components of such a controller 1100 are shown in representative block diagram form in FIG. 6. In FIG. 6, the controller 1100 includes a CPU 1102, clock 1104, RAM 1108, ROM 1110, a timer 1112, a BUS controller 1114, an interface 1116, and an analog-to-digital converter (ADC) 1118 interconnected via a BUS 1106.

The CPU 1102 may be implemented as one or more single core or multi-core processors, and receive signals from an interrupt controller 1120 and a clock 1104. The clock 1104 may set the operating frequency of the entire microcontroller 1100 and may include one or more crystal oscillators having predetermined frequencies. Alternatively, the clock 1104 may receive an external clock signal. The interrupt controller 1120 may also send interrupt signals to the CPU, to suspend CPU operations. The interrupt controller 1120 may transmit an interrupt signal to the CPU when an event requires immediate CPU attention.

The RAM 1108 may include one or more Static Random Access Memory (SRAM), Dynamic Random Access Memory (DRAM), Synchronous Dynamic Random Access Memory (SDRAM), Double Data-Rate Random Access Memory (DDR SDRAM), or other suitable volatile memory. The Read-only Memory (ROM) 1110 may include one or more Programmable Read-only Memory (PROM), Erasable Programmable Read-only Memory (EPROM), Electronically Erasable Programmable Read-only memory (EEPROM), flash memory, or other types of non-volatile memory.

The timer 1112 may keep time and/or calculate the amount of time between events occurring within the controller 1100, count the number of events, and/or generate baud rate for communication transfer. The BUS controller 1114 may prioritize BUS usage within the controller 1100. The ADC 1118 may allow the controller 1100 to send out pulses to signal other devices.

The interface 1116 may comprise an input/output device that allows the controller 1100 to exchange information with other devices. In some implementations, the interface 1116 may include one or more of a parallel port, a serial port, or other computer interfaces.

In addition, aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 2000 is shown in FIG. 7.

The computer system 2000 may include one or more processors, such as processor 2004. The processor 2004 may be connected to a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data.

Alternative aspects of the present disclosure may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and other removable storage units 2022 and interfaces 2020, which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a Personal Computer Memory Card International Association (PCMCIA) slot and card, etc. Software and data transferred via communications interface 2024 are in the form of signals 2028, which may be electronic, electromagnetic, optical or other signals capable of being received by communications interface 2024. These signals 2028 are provided to communications interface 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as a removable storage drive 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard drive 2012, or communications interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

FIG. 7 is a block diagram of various example communication system components usable in accordance with an aspects of the present disclosure. The communication system 2100 includes one or more accessors 2160, 2162 (which may for example comprise any of the aforementioned systems and features) and one or more terminals 2142, 2166. In one aspect, data for use in accordance with aspects of the present disclosure is, for example, input and/or accessed by accessors 2160, 2162 via terminals 2142, 2166, such as personal computers (PCs), minicomputers, mainframe computers, microcomputers, telephonic devices, or wireless devices, such as personal digital assistants ("PDAs") or a hand-held wireless devices coupled to a server 2143, such as a PC, minicomputer, mainframe computer, microcomputer, or other device having a processor and a repository for data and/or connection to a repository for data, via, for example, a network 2144, such as the Internet or an intranet, and couplings 2145, 2146, 2164. The couplings 2145, 2146, 2164 include, for example, wired, wireless, or fiberoptic links. In another example variation, the method and system in accordance with aspects of the present disclosure operate in a stand-alone environment, such as on a single terminal.

Additional aspects of vehicle safety and convenience features that are usable in combination with the features of this disclosure are described in U.S. Pat. No. 9,387,813, titled "Device, System and Method for Aggregating Networks and Serving Data from Those Networks to Computers," U.S. Pat. No. 10,489,326, titled "Device, System and Method for Aggregating Networks and Serving Data from Those Networks to Computers," U.S. Pat. No. 10,109,116, titled "Device, System and Method for Aggregating Networks and Serving Data from Those Networks to Computers," US Patent Application Publication No. 2017/0124881, titled "Blind Zone Warning for Semi-Trailer." All of the listed patents and publications listed above are hereby incorporated herein in their entirety for all purposes.

Additional aspects that are usable in combination with aspects of this disclosure are described in US Patent Application Publication No. 2022/0396205, titled "Dual-sided Display for a Vehicle," U.S. Pat. No. 11,467,401, titled "Display and Light Blocking Screens," US Patent Application No. 2015/0353014, titled "Devices, Systems and Method for Identifying Potentially Dangerous Oncoming Cars," European Publication EP1407931, titled "Process and System for Assisting a Driver," US Patent Application Publication No. 2017/0124407, titled "Predicting Vehicle Movements Based on Driver Body Language," U.S. Pat. No. 9,767,693, titled "Transparent Display Apparatus for Displaying Information of Danger Element, and Method Thereof" and European Publication EP 2168815, titled "Method and Device for Detecting Possibly Colliding Objects in a Blind Spot Area." All of the listed patents and publications listed above are hereby incorporated herein in their entirety for all purposes.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the above-mentioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art.

What is claimed is:

1. A window display system for a vehicle, the system configured to display blind spot information to an occupant of the vehicle, the system comprising:

a window of the vehicle, the window having an interior side facing a passenger compartment of the vehicle and an exterior side facing away from the passenger compartment;

a transparent display integrated with the window and configured to present visual information to the occupant through the interior side of the window;

one or more environment sensors mounted on the vehicle and configured to acquire visual data of an exterior environment of the vehicle corresponding to a blind spot region;

one or more turn signal sensors operatively coupled to a turn signal of the vehicle and configured to detect activation of the turn signal;

a controller operatively connected to the transparent display, the one or more environment sensors, and the one or more turn signal sensors, the controller comprising:

a processor; and memory storing instructions that, when executed by the processor, cause the controller to:

detect, using the visual data from the environment sensors, an object present in the blind spot region;

detect, using the turn signal sensors, activation of the turn signal of the vehicle; and in response to detecting the object in the blind spot region and detecting activation of the turn signal, cause the transparent display to overlay a highlighted visual representation of the object on the interior side of the window.

2. The system of claim 1, wherein the transparent display is integrated with a windshield of the vehicle at a location corresponding to a hood mirror or a fender mirror.

3. The system of claim 1, further comprising:

a gaze detector operatively connected to the controller, the gaze detector being configured to determine a line of sight of the occupant; and wherein the instructions further cause the controller to overlay the highlighted visual representation only when the line of sight of the occupant is directed toward the transparent display.

4. The system of claim 1, wherein the transparent display comprises:

a liquid crystal array layer, the liquid crystal array layer being configured to vary transparency of the window; and an organic light emitting diode layer, the organic light emitting diode layer being configured to display the highlighted representation.

5. The system of claim 1, wherein the highlighted visual representation comprises a color-coded outline, the color indicating a level of hazard associated with the detected object.

6. The system of claim 1, wherein the instructions further cause the controller to:

determine a vehicle mode as one of a highway mode and a city mode based on a speed of the vehicle; and in the highway mode, display the highlighted visual representation only for objects determined to have a predetermined hazard level, while in the city mode, display the highlighted visual representation for each detected object in the blind spot region.

7. The system of claim 1, wherein the one or more environment sensors comprise at least one of a camera, a fish-eye camera, a wide-angle camera, or an infrared camera.

8. The system of claim 1, wherein the instructions further cause the controller to:

remove or darken a background portion of a visual representation corresponding to a region of the blind spot excluding the detected object, the background portion being removed or darkened to emphasize the highlighted visual representation.

9. The system of claim 1, further comprising:

one or more radar or lidar sensors configured to generate a point cloud of the exterior environment; and wherein the instructions further cause the controller to detect the object in the blind spot region based on the point cloud.

10. The system of claim 1, further comprising:

one or more vehicle sensors operatively connected to the controller, wherein the one or more vehicle sensors comprise:

a steering wheel sensor; and a wheel speed sensor; and wherein the instructions further cause the controller to modify the highlighted representation based on rotation data from the steering wheel sensor and speed data from the wheel speed sensor.

11. The system of claim 1, wherein the one or more turn signal sensors comprise a data interface operable to receive a turn signal activation status from a Controller Area Network bus of the vehicle.

12. A non-transitory computer readable medium storing instructions that, when executed by a processor of a window display system for a vehicle, cause the processor to:

receive visual data acquired by one or more environment sensors mounted on the vehicle, the visual data corresponding to an exterior environment of the vehicle including a blind spot region;

receive a signal from one or more turn signal sensors operatively coupled to a turn signal of the vehicle, the signal indicating activation of the turn signal;

detect, using the visual data from the environment sensors, an object present in the blind spot region;

detect, using the signal from the turn signal sensors, activation of the turn signal of the vehicle; and in response to detecting the object in the blind spot region and detecting activation of the turn signal, cause a transparent display integrated with a window of the vehicle, the window having an interior side facing a passenger compartment of the vehicle and an exterior side facing away from the passenger compartment, to overlay a highlighted visual representation of the object on the interior side of the window.

13. The non-transitory computer readable medium of claim 12, wherein the instructions, when executed by the processor, cause the processor to:

control a transparent display comprising a liquid crystal array layer configured to vary transparency of the window and an organic light emitting diode layer configured to display the highlighted visual representation.

14. The non-transitory computer readable medium of claim 12, wherein the instructions, when executed by the processor, cause the processor to:

cause the highlighted visual representation to comprise a color-coded outline, the color indicating a level of hazard associated with the detected object.

15. The non-transitory computer readable medium of claim 12, wherein the instructions, when executed by the processor, further cause the processor to:

determine a vehicle mode as one of a highway mode and a city mode based on a speed of the vehicle; and in the highway mode, display the highlighted representation only for objects determined to have a predetermined hazard level, while in the city mode, display the highlighted visual representation for each detected object in the blind spot region.

16. The non-transitory computer readable medium of claim 12, wherein the instructions, when executed by the processor, cause the processor to:

receive visual data from one or more environment sensors comprising at least one of a camera, fish-eye camera, a wide-angle camera, or an infrared camera.

17. The non-transitory computer readable medium of claim 12, wherein the instructions, when executed by the processor, further cause the processor to:

receive data from a gaze detector configured to determine a line of sight of the occupant; and overlay the highlighted visual representation only when the line of sight of the occupant is directed toward the transparent display.

18. The non-transitory computer readable medium of claim 12, wherein the instructions, when executed by the processor, further cause the processor to:

remove or darken a background portion of a visual information corresponding to a region of the blind spot excluding the detected object, the background portion being removed or darkened to emphasize the highlighted visual representation.

19. The non-transitory computer readable medium of claim 12, wherein the instructions, when executed by the processor, further cause the processor to:

receive data from one or more radar or lidar sensors configured to generate a point cloud of the exterior environment; and detect the object in the blind spot region based on the point cloud.

20. The non-transitory computer readable medium of claim 12, wherein the instructions, when executed by the processor, further cause the processor to:

receive data from one or more vehicle sensors comprising a steering wheel sensor and a wheel speed sensor; and modify the highlighted visual representation based on rotation data from the steering wheel sensor and speed data from the wheel speed sensor.

21. The non-transitory computer readable medium of claim 12, wherein the instructions, when executed by the processor, further cause the processor to:

receive a turn signal activation status from a data interface operable to receive the status from a Controller Area Network bus of the vehicle.

22. The non-transitory computer readable medium of claim 12, wherein the instructions, when executed by the processor, further cause the processor to:

cause the transparent display to display images on a windshield of the vehicle at a location corresponding to a hood mirror or a fender mirror.

* * * * *